(Model.)
N. GALLINGER.
MUZZLE.
No. 254,302. Patented Feb. 28, 1882.
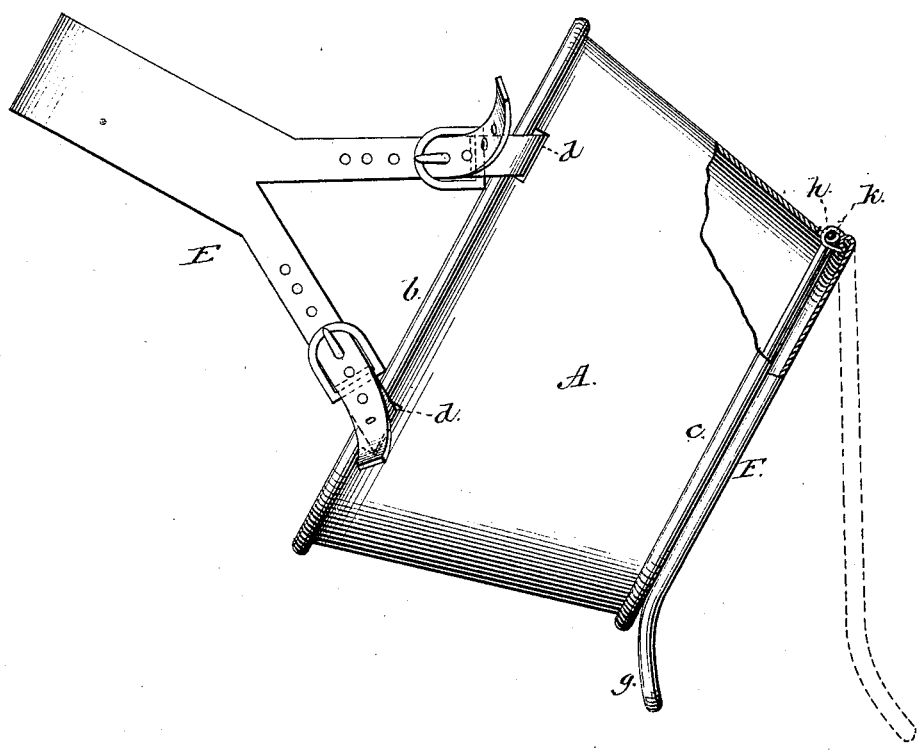
WITNESSES
John A. Ellis.
Philip C. Masi.
INVENTOR
Nelson Gallinger,
by Anderson Smith
his ATTORNEYS

United States Patent Office.

NELSON GALLINGER, OF RAPID CITY, DAKOTA TERRITORY.

MUZZLE.

SPECIFICATION forming part of Letters Patent No. 254,302, dated February 28, 1882.

Application filed January 7, 1882. (Model.)

*To all whom it may concern:*

Be it known that I, NELSON GALLINGER, a citizen of the United States, resident at Rapid City, in the county of Pennington, Dakota Territory, have invented certain new and useful Improvements in Muzzles; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification, in which the figure is a representation of a side elevation, partly in section.

This invention has relation to devices for muzzling calves and colts so as to prevent them from suckling; and it consists in the construction and novel arrangement of the metallic nose-band, the fastening-straps attached to one end thereof, and the falling cover hinged to the upper portion of the margin of the other or smaller end, all as hereinafter set forth, and especially pointed out in the appended claim.

The object of this invention is to prevent calves and colts from suckling, and yet allow them some facility in learning to graze.

In the accompanying drawing, the letter A designates the metallic nose-band, which is made broad and wider at one end, $b$, than at the other end, $c$, to fit the animal and allow some movement to the lower jaw. Each end of the nose-band is designed to be wired to give it strength and prevent injury to the animal. Next the wired edge of the larger end, $b$, are made slots $d$, through which the ends of the fastening-straps E are passed and secured.

F indicates the nose-cover, which is also made of metal, and is wired around its edge $g$ to prevent it from being bent out of shape. The upper edge of the cover is provided with hinge-loops $h$, which extend around the wire $k$ at the upper edge of the smaller end, $c$, of the nose-band, so that the cover is hinged thereto. The lower end of the cover is curved outward, so that it is not liable to become jammed in the ground when the animal depresses its head, but will fall open freely. When the head is raised the cover will fall toward the nose-band and effectually prevent suckling. In order to prevent the eyes of the animal from being injured by the metallic glare, the muzzles should be painted.

Having described this invention, what I claim, and desire to secure by Letters Patent, is—

The muzzle herein described, consisting of the nose-band A, formed of metal, and having the wired ends $b\ c$, the straps E, attached thereto at the larger end, and the falling nose-cover F, hinged to the upper edge of the smaller end of the nose-band, and having its lower end turned outwardly, substantially as specified.

In testimony whereof I affix my signature in presence of two witnesses.

NELSON GALLINGER.

Witnesses:
CHAUNCEY L. WOOD,
ROBERT THOMSON.